United States Patent [19]

McCullough et al.

[11] 4,017,589

[45] Apr. 12, 1977

[54] PRODUCTION OF AMMONIUM POLYPHOSPHATES FROM MELAMINE PHOSPHATES

[75] Inventors: John F. McCullough, Florence; Richard C. Sheridan, Sheffield, both of Ala.

[73] Assignee: Tennessee Valley Authority, Muscle Shoals, Ala.

[22] Filed: Mar. 17, 1976

[21] Appl. No.: 667,553

Related U.S. Application Data

[63] Continuation of Ser. No. 619,710, Oct. 6, 1975, now Defense Publication No. T952,008.

[52] U.S. Cl. .............................. 423/315; 423/305; 71/43
[51] Int. Cl.² .................. C01B 15/16; C01B 25/26
[58] Field of Search .................. 423/305, 314, 315; 71/43

[56] References Cited

UNITED STATES PATENTS 3,912,802  10/1975  McCullough et al. ............. 423/306

3,920,796  11/1975  Sheridan ............................ 423/313

OTHER PUBLICATIONS

T921,024, May 1974, Sheridan, 423/305.
T904,031 Nov. 1972, McCullough et al., 423/305.

*Primary Examiner*—G. O. Peters
*Assistant Examiner*—Gregory A. Heller
*Attorney, Agent, or Firm*—Robert A. Petrusek

[57] ABSTRACT

Ammonium polyphosphates are prepared by a process which comprises heating melamine orthophosphate prepared from impure wet-process phosphoric acid in a stream of gaseous ammonia at a temperature between 150° C and 210° C to produce a mixture of melamine and relatively pure short-chain ammonium polyphosphates. The solid product is extracted with water to remove the ammonium polyphosphates and free the insoluble, crystalline melamine for recycle. Thus, the only starting materials consumed in the process are phosphoric acid and ammonia.

6 Claims, 2 Drawing Figures

PREPARATION OF AMMONIUM
POLYPHOSPHATE BY MELAMINE

EFFECT OF TIME AND TEMPERATURE ON THE CUMULATIVE DISTRIBUTION OF SPECIES IN AMMONIUM PHOSPHATES PREPARED FROM MELAMINE PHOSPHATE
(Distance between curves represents the percentage of species)

PRODUCTION OF AMMONIUM POLYPHOSPHATES FROM MELAMINE PHOSPHATES

The invention herein described may be manufactured and used by or for the Government for governmental purposes without the payment to us of any royalty therefor.

This application is a continuation of our copending application Ser. No. 619,710, filed Oct. 6, 1975, for PRODUCTION OF AMMONIUM POLYPHOSPHATES FROM MELAMINE PHOSPHATES, now Defensive Publication No. T952,008.

The present invention relates to the production of ammonium polyphosphates, and more particularly it relates to an improved process for the production of relatively pure mixtures of short-chain ammonium polyphosphates from impure wet-process phosphoric acid.

Wet-process phosphoric acid is produced by decomposing phosphate rock, particularly calcium phosphate, with sulfuric acid and separating the phosphoric acid from the precipitated calcium sulfate. The resulting crude phosphoric acid contains various amounts of impurities such as iron, aluminum, calcium, magnesium, and other metals in the form of their phosphates, sulfates, or fluorides, depending on the characteristics of the particular rock which is used as a starting material and on the practice of the process. Because of the simplicity and desirable economics of its manufacture, wet-process phosphoric acid is regarded as an excellent source of fertilizer grade phosphates. However, because of the presence of the aforementioned impurities its use is fraught with many difficulties and complications and has heretofore been limited generally to solid fertilizers. As is well known, when wet-process phosphoric acid is treated with ammonia to form aqueous ammonium phosphate solutions, the impurities present in the acid form both gelatinous and crystalline precipitates which are extremely difficult to separate from the aqueous phase by filtration or other conventional separation methods. These precipitates form large deposits in the equipment used for storage and transfer and make handling difficult.

One of several recent breakthroughs in overcoming the disadvantages of wet-process phosphoric acid is taught and described in U.S. Letters Patent application Ser. No. 393,413, Aug. 31, 1973, Richard C. Sheridan, and assigned to the assignee of the present application. (Also, see Defensive Publication No. T921,024.) Sheridan teaches that melamine is added to impure wet-process phosphoric acid to form crystals of insoluble melamine orthophosphate, $C_3N_3(NH_2)_3 \cdot H_3PO_4$ which are separated from the mother liquor and caused to react with an aqueous solution of ammonia thereby forming crystals of melamine for recycle and a solution of purified ammonium orthophosphate. In another embodiment of Sheridan's process, the melamine phosphate is heated to convert it to melamine pyrophosphate, $[C_3N_3(NH_2)_3]_2 \cdot H_4P_2O_7$, which is allowed to react with aqueous ammonia with the formation of crystalline melamine and a solution of purified ammonium pyrophosphate. The melamine processes, as taught by Sheridan, provide improved methods for the production of ammonium orthophosphate and ammonium pyrophosphate; however, they do not produce mixtures of short-chain ammonium polyphosphates containing species such as ammonium tripoly-, tetrapoly-, and pentapolyphosphates which are highly desirable for use in liquid fertilizers.

In view of the foregoing it is an object of the present invention to provide a new and vastly improved process for producing mixtures of shortchain ammonium polyphosphates.

A still further object of the present invention is to provide an economical process for producing relatively pure ammonium polyphosphates suitable for use in liquid fertilizers from melamine phosphate prepared from wet-process orthophosphoric acid.

According to the present invention, ammonium polyphosphates are produced by a process which comprises heating melamine orthophosphate prepared from wet acid, supra, in a stream of gaseous ammonia at a temperature between 150° C and 210° C to produce a mixture of melamine and relatively pure shortchain ammonium polyphosphates. The solid product is extracted with water to remove the ammonium polyphosphates and free the insoluble, crystalline melamine for recycle. Thus, the only starting materials consumed in the process are phosphoric acid and ammonia.

A reaction temperature of at least 150° C is necessary for the formation of ammonium phosphates. Preferably temperatures above about 210° C are avoided, since at such high temperatures melamine long-chain polyphosphate is formed rather than the desired ammonium phosphates. The preferred temperature range is 160° to 200° C.

The time of heating will vary, depending upon the temperature and the degree of condensation desired. For example, a reaction time of 90 minutes at 160° C gave complete conversion of the melamine orthophosphate to ammonium phosphates, but only 39 percent of the phosphate was in the form of ammonium polyphosphate. By heating at 200° C for 10 and 20 minutes, 80 and 89 percent, respectively, of the product was present as short-chain ammonium polyphosphate.

Sufficient ammonia is preferably introduced to give a completely neutralized product having a pH of about 7.0. (sweep gas 10–100 vol. % $NH_3$).

Our process is advantageously carried out at about atmospheric pressure thereby avoiding the use of costly equipment and allowing easy removal of the water which is split off during the formation of the polyphosphates. However, the pressure is not critical, and pressures above or below atmospheric pressure may be used if it is found desirable to do so.

Another advantage of the present invention is that the reaction may be carried out in a rotating, tumbling bed reactor on a continuous basis in which melamine phosphate is fed in and the dry, free-flowing easily handled product of melamine and ammonium polyphosphates is withdrawn.

As shown in FIG. 1, another advantage of the present invention is that the distribution of phosphate species may be varied by regulating the time and temperature of heating. For example, a product containing 11 percent ortho-, 35 percent pyro-, 17 percent tri-, 14 percent tetra-, and 23 percent more highly condensed phosphates was obtained by heating 20 minutes at 200° C; however, heating for 40 minutes at 180° C yielded a product containing 26 percent ortho-, 60 percent pyro-, 10 percent tri-, 2 percent tetra-, and 2 percent more highly condensed phosphates. Thus, one may conveniently prepare fertilizer solutions having a wide range of phosphate species by selecting the proper time and temperature of heating.

The mixture of melamine and ammonium phosphates is treated with water or a dilute solution of ammonium polyphosphate to dissolve the product ammonium phosphates. The resulting slurry is filtered to separate the insoluble melamine from the solution of ammonium polyphosphate. The melamine is then recycled and used to produce more melamine phosphate.

The liquid ammonium polyphosphate product is relatively pure because most of the impurities in the wet-process phosphoric acid are removed in the preparation of melamine phosphate. The resulting solution has substantial value as a fertilizer because of its ability to supply easily dispensed primary nutrients as well as trace amounts of metallo micro nutrients. In addition, the solution is very stable since it contains only a small percentage of impurities and is stabilized by the polyphosphate content which acts as a sequestering agent for the trace elements present.

Our invention, together with further objects and advantages thereof, will be better understood from a consideration of the following description taken in connection with the accompanying drawings in which.

Figure 1:
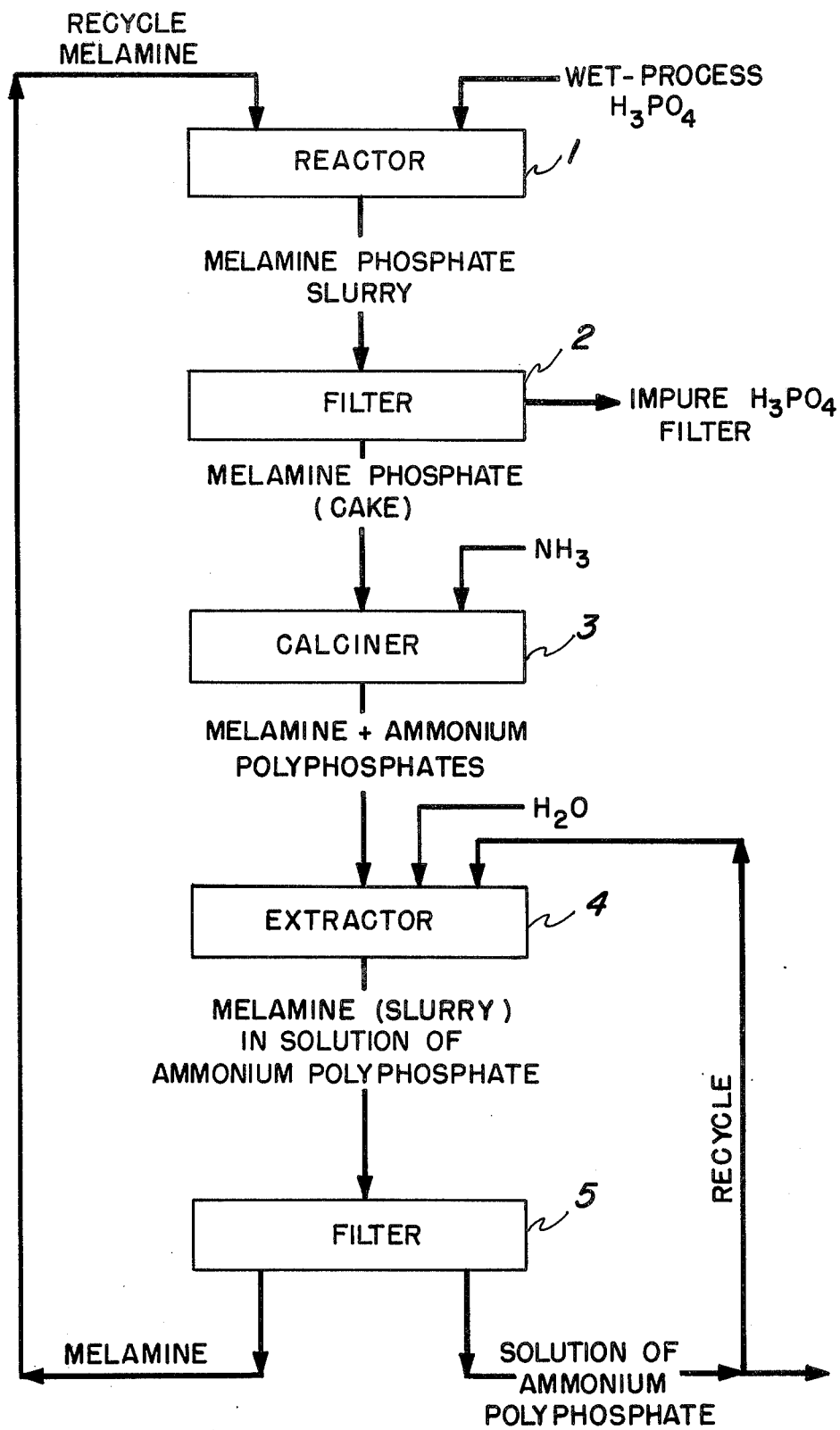
FIG. 1 represents a flowsheet in box form generally illustrating the principles of our new and novel process for the manufacture of ammonium polyphosphates.

Referring now more specifically to FIG. 1, 1 represents any vessel suitable for containing the reaction mixture of melamine and wet-process phospheric acid during the reaction period. The slurry from reaction vessel 1 is fed to filter 2 where the mother liquor containing the impurities is separated from the crystals of melamine phosphate. Subsequently, the melamine phosphate is heated in reaction vessel 3 and neutralized with gaseous ammonia. The resulting mixture of melamine and ammonium polyphosphate is extracted with water in reaction vessel 4. The resulting mixture of solid crystalline melamine suspended in the solution of ammonium polyphosphate is fed to filter 5 where the melamine is recovered for recycle to reactor 1. The solution of ammonium polyphosphate may be recycled to reaction vessel 4 until the desired concentration is obtained.

Figure 2:
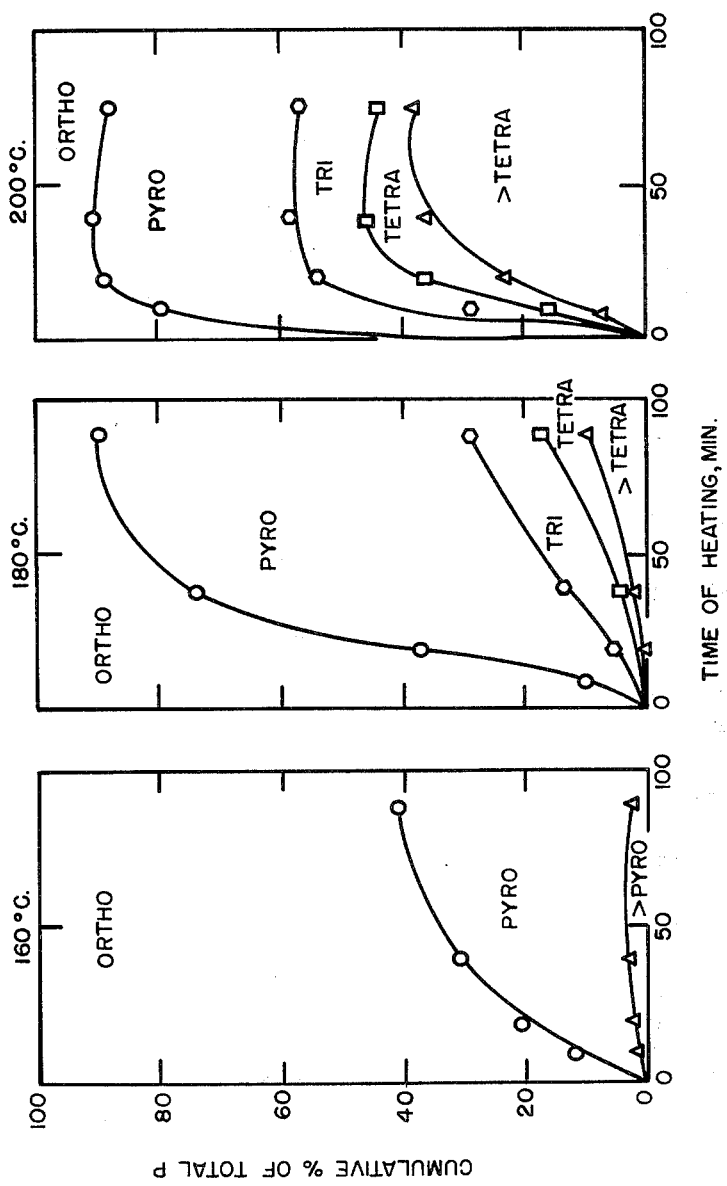
FIG. 2 represents a plot of effect of time and temperature on the cumulative distribution of species in ammonium phosphates prepared from melamine phosphate in which the distance between curves represents the percentage of species.

For convenience, more specific reference to FIG. 2 is made in the paragraph supra and in examples II, III, and IV, table 1, infra.

After sifting and winnowing through the data presented in the examples infra, the FIGURES, as well as other data which we have assembled in discovering and developing our invention, we have determined that the operable parameters and preferred embodiments of our invention are as follows:

The temperature at which melamine phosphate is neutralized with gaseous ammonia is operable from about 150° to about 210° C, preferably about 175° C to about 200° C.

The melamine phosphate is completely neutralized to melamine and ammonium phosphate in less than 10 minutes, but the time of heating depends on the temperature and the distribution of phosphate species desired. At 160° C, phosphate condensation proceeds rather slowly and a longer time is required to produce polyphosphates than at higher temperatures. On the other hand, a short reaction time is preferred at 200° C, for example, to avoid the formation of highly condensed, sparingly soluble species.

In order that those skilled in the art may better understand how the present invention can be practiced, the following examples are given by way of illustration and not by way of limitation.

EXAMPLE I

Melamine phosphate prepared from wet-process phosphoric acid (1-gram samples) was heated in an ammonia stream at 140° C for period ranging up to 246 minutes. Paper chromatographic analysis, x-ray powder diffraction, and pH measurement showed that no reaction occurred. The results are listed under test No. 1 in table 1. For convenience, table 1, as well as table II, infra, are shown after Examples I to V are introduced.

EXAMPLE II

Melamine phosphate was heated in an ammonia stream at 160° C for periods of 10, 20, 40, and 90 minutes. Analysis by paper chromatography, x-ray powder diffraction, and pH measurement showed that melamine and ammonium phosphates were formed having the distributions listed under test Nos. 2, 3, 4, and 5 in table 1, infra. The cumulative distribution of phosphate species is plotted as a function of the time of heating in FIG. 1, supra.

EXAMPLE III

Melamine phosphate was heated in an ammonia stream at 180° C for periods of 10, 20, 40, and 90 minutes. Analysis by paper chromatography, x-ray powder diffraction, and pH measurement showed that melamine and ammonium phosphates were formed; the phosphate had the distribution of species shown under test Nos. 6, 7, 8, and 9 in table 1, infra. The cumulative distribution of phosphate species is plotted as a function of time of heating in FIG. 1, supra.

EXAMPLE IV

Melamine phosphate was heated in an ammonia stream at 200° C for periods of 10, 20, 40, and 75 minutes. Analysis by paper chromatography, x-ray powder diffraction, and pH measurements showed that melamine and ammonium phosphates were formed; the phosphate had the distribution of species listed under test Nos. 10, 11, 12, and 13 in table 1, infra. The cumulative distribution of species is plotted as a function of time of heating in FIG. 1, supra.

EXAMPLE V

Melamine phosphate was heated in an ammonia stream at 230° C for periods of 5, 10, 20, and 40 minutes, at 250° C for periods of 10, 20, and 75 minutes, and at 300° C for 10 minutes or 235° C for 165 minutes. Analysis by paper chromatography, x-ray powder diffraction, and pH meansurement showed that the products were melamine phosphates; no free melamine or ammonium phosphates were detected. The results are given under test Nos. 14–22 in table II, infra.

Table 1

Reactions of Melamine Orthophosphate in Gaseous Ammonia

| Test No. | 1 | 2 | 3 | 4 | 5 | 6 | 7 | 8 | 9 | 10 | 11 | 12 | 13 |
|---|---|---|---|---|---|---|---|---|---|---|---|---|---|
| Reaction conditions | | | | | | | | | | | | | |
| Temperature, °C | 140 | 160 | 160 | 160 | 160 | 180 | 180 | 180 | 180 | 200 | 200 | 200 | 200 |
| Time, minutes | 246 | 10 | 20 | 40 | 90 | 10 | 20 | 40 | 90 | 10 | 20 | 40 | 75 |
| pH of 2% slurry | 3.6 | 7.3 | 7.4 | 7.4 | 7.6 | 7.2 | 7.2 | 7.3 | 7.3 | 7.1 | 7.2 | 7.3 | 7.4 |
| Distribution, % of P | | | | | | | | | | | | | |
| Ortho | 100 | 87.1 | 79.0 | 68.6 | 59.1 | 89.3 | 62.7 | 25.8 | 10.7 | 20.2 | 10.8 | 8.9 | 11.6 |
| Pyro | — | 11.2 | 18.5 | 28.3 | 38.4 | 10.7 | 32.2 | 60.0 | 59.9 | 50.3 | 35.1 | 32.6 | 36.1 |
| Tri | — | — | — | — | — | — | 5.0 | 10.3 | 12.3 | 13.9 | 16.9 | 12.6 | 7.9 |
| Tetra | — | — | — | — | — | — | — | 2.2 | 7.0 | 8.1 | 13.5 | 8.9 | 5.3 |
| Other | — | 1.6 | 2.5 | 3.1 | 2.5 | 0.0 | 0.1 | 1.7 | 10.1 | 7.5 | 23.6 | 37.0 | 39.0 |
| Av. chain length | 1.0 | 1.07 | 1.12 | 1.19 | 1.26 | 1.06 | 1.24 | 1.67 | 2.08 | 1.9 | 2.4 | — | — |
| Crystalline phases[a] | | | | | | | | | | | | | |
| $C_3H_6N_6 \cdot H_3PO_4$ | H | — | — | — | — | — | — | — | — | — | — | — | — |
| $(C_3H_6N_6)_2 \cdot H_4P_2O_7$ | — | — | — | — | — | — | — | — | — | v.m.[b] | — | — | — |
| $C_3H_6N_6 \cdot HPO_3$ | — | — | — | — | — | — | — | — | — | — | — | — | v.m.[b] |
| $C_3H_6N_6$ | — | m-M | m-M | m-M | m-M | m-M | m-M | m-M | m-M | v.m.[b] | m-M[b] | M[b] | M[b] |
| $NH_4H_2PO_4$ | — | — | — | — | — | v.m[b] | — | v.m.[b] | — | — | — | — | — |
| $(NH_4)_2HPO_4$ | — | M | m[b] | M | m[b] | m | m | m | m | — | — | — | — |
| $(NH_4)_3HP_2O_7$ | — | m[b] | m-M[b] | m[b] | m-M[b] | v.m.[b] | m[b] | m-M[b] | m[b] | M[b] | M[b] | m-M[b] | m-M[b] |
| $(NH_4)_4P_2O_7$ | — | — | — | — | — | — | m | — | — | — | — | — | — |
| CAPP[c] | — | — | — | — | — | — | — | — | v.m. | — | v.m. | m-M | m-M |
| Unidentified | — | m-M | M | m-M | m-M | M | v.m. | — | — | m-M[b] | m[b] | m[b] | m[b] |

[a]H - homogeneous, M - major, m - minor, v.m. - very minor.
[b]Tentative identification.
[c]Long-chain crystalline ammonium polyphosphate.

Table II

Reactions of Melamine Orthophosphate in Gaseous Ammonia

| Test No. | 14 | 15 | 16 | 17 | 18 | 19 | 20 | 21 | 22 |
|---|---|---|---|---|---|---|---|---|---|
| Reaction conditions | | | | | | | | | |
| Temperature, °C | 230 | 230 | 230 | 230 | 250 | 250 | 250 | 300 | 235 |
| Time, minutes | 5 | 10 | 20 | 40 | 10 | 20 | 75 | 10 | 165 |
| pH of 2% slurry | 4.1 | 6.3 | 5.4 | 5.2 | 4.6 | 4.5 | 4.7 | 4.2 | 6.1 |
| Distribution % of P | | | | | | | | | |
| Ortho | 54.1 | 10.3 | 5.8 | 3.8 | 7.5 | 4.1 | 4.2 | — | — |
| Pyro | 32.9 | 64.0 | 72.9 | 82.3 | 72.8 | 72.6 | 61.0 | — | — |
| Tri | 7.5 | 9.7 | 5.3 | 3.1 | 6.4 | 6.0 | 12.3 | — | — |
| Tetra | 2.8 | 6.9 | 5.3 | 4.2 | 4.1 | 4.8 | 4.3 | — | — |
| Other | 2.7 | 9.1 | 10.7 | 6.6 | 9.2 | 12.5 | 18.2 | 100 | 100 |
| Av. chain length | 1.35 | 2.04 | 2.11 | 2.07 | 2.1 | 2.2 | — | — | — |
| Crystalline phases[a] | | | | | | | | | |
| $(C_3H_6N_6)_2 \cdot H_4P_2O_7$ | M | B | B | B | B | B | M-B | — | — |
| $C_3H_6N_6 \cdot HPO_3$ | — | — | — | — | — | — | — | H | H |
| CAPP | — | t | t | v.m.[b] | v.m.[b] | v.m.[b] | v.m-m[b] | — | — |
| Unidentified | m[c] | — | — | — | — | — | — | — | — |

[a]H - homogeneous, M - major, B - bulk, m - minor, v.m. - very minor, t - trade.
[b]Tentative identification.
[c]Different from unidentified phase formed at lower temperatures.

While we have shown and described particular embodiments of our invention, modifications and variations thereof will occur to those skilled in the art. We wish it to be understood, therefore, that the appended claims are intended to cover such modifications and variations that are within the true scope and spirit of the invention.

What we claim as new and desire to secure by letters patent of the United States is:

1. A process for manufacturing short-chain ammonium polyphosphates, which process comprises the steps of:
    1. heating melamine orthophosphate in an atmosphere of ammonia to a temperature between 150° and 210° C for a predetermined time sufficient to convert said melamine phosphate to crystalline melamine and ammonium polyphosphates;
    2. separating said crystals of melamine formed by the reaction of said ammonia with said melamine orthophosphate in step 1, supra, and recovering said ammonium polyphosphates as product.

2. The process of claim 1 in which the melamine orthophosphate is derived from wet-process phosphoric acid.

3. The process of claim 1 in which the product is a mixture of short-chain ammonium polyphosphates and ammonium orthophosphate.

4. The process of claim 1 in which the temperature ranges between 175° and 200° C.

5. The process of claim 1 in which the time ranges between about 10 minutes and about 90 minutes.

6. The process of claim 1 wherein said atmosphere of ammonia is maintained over the melamine orthophosphate material by means of continuously sweeping said area with a gas containing about 10 volume percent to about 100 volume percent of ammonia.

* * * * *